(12) United States Patent
Stoppek

(10) Patent No.: US 6,491,206 B2
(45) Date of Patent: Dec. 10, 2002

(54) METHOD OF MAKING CLOSED CAVITY PISTONS

(75) Inventor: Robert J. Stoppek, Huxley, IA (US)

(73) Assignee: Sauer-Danfoss, Inc., Ames, IA (US)

(*) Notice: Subject to any disclaimer, the term of this patent is extended or adjusted under 35 U.S.C. 154(b) by 0 days.

(21) Appl. No.: 09/975,691

(22) Filed: Oct. 11, 2001

(65) Prior Publication Data

US 2002/0096047 A1 Jul. 25, 2002

Related U.S. Application Data

(63) Continuation-in-part of application No. 09/722,617, filed on Nov. 27, 2000.

(51) Int. Cl.$^7$ ................................................ B23K 20/12
(52) U.S. Cl. ..................................... 228/114.5; 228/113
(58) Field of Search ............................ 228/114.5, 113, 228/112.1, 110.1, 1.1, 2.1, 2.3; 92/260, 231

(56) References Cited

U.S. PATENT DOCUMENTS

| | | |
|---|---|---|
| 3,187,644 A | 6/1965 | Ricketts |
| 3,319,575 A | 5/1967 | Havens |
| 3,707,113 A | 12/1972 | Hein et al. |
| 3,741,007 A | 6/1973 | Hulsebus et al. |
| 3,882,762 A | 5/1975 | Hein |
| 3,896,707 A | 7/1975 | Holmstrom |
| 3,915,074 A | 10/1975 | Bristow et al. |
| 3,984,904 A | 10/1976 | Schlecht |
| 3,986,439 A | 10/1976 | Ring |
| 3,999,468 A | 12/1976 | Bristow et al. |
| 4,191,095 A | 3/1980 | Heyl |
| 4,216,704 A | 8/1980 | Heyl |
| 4,494,448 A | 1/1985 | Eysstratov et al. |
| 4,519,300 A | 5/1985 | Adomis, Jr. et al. |
| 5,007,332 A | 4/1991 | Wagenseil |
| 5,072,655 A | 12/1991 | Adler |
| 5,076,148 A | 12/1991 | Adler |
| 5,211,100 A | * 5/1993 | Fuller et al. ............... 156/73.5 |
| 5,216,943 A | 6/1993 | Adler et al. |
| 5,265,331 A | 11/1993 | Engel et al. |
| 5,490,446 A | 2/1996 | Engel |
| 5,553,378 A | 9/1996 | Parekh et al. |
| 5,642,654 A | 7/1997 | Parekh et al. |
| 6,138,896 A | * 10/2000 | Ablett et al. ................. 228/113 |

* cited by examiner

*Primary Examiner*—M. Alexandra Elve
*Assistant Examiner*—Len Tran

(57) ABSTRACT

A closed cavity piston includes an elongated piston body and a separately formed piston cap having an elongated stem and head thereon. The body includes a closed end and an open end with a cavity having a bottom wall adjacent the closed end and an outer wall terminating in a rim at the open end. The stem of the piston cap is friction inertia welded to the bottom wall of the piston body and the head of the piston cap welds to the rim of the piston body. The stem of the cap is inserted into the cavity of the body until it engages the bottom wall. Then the cap is friction inertia welded to the body at the stem/bottom wall and head/rim interfaces after preheating.

11 Claims, 5 Drawing Sheets

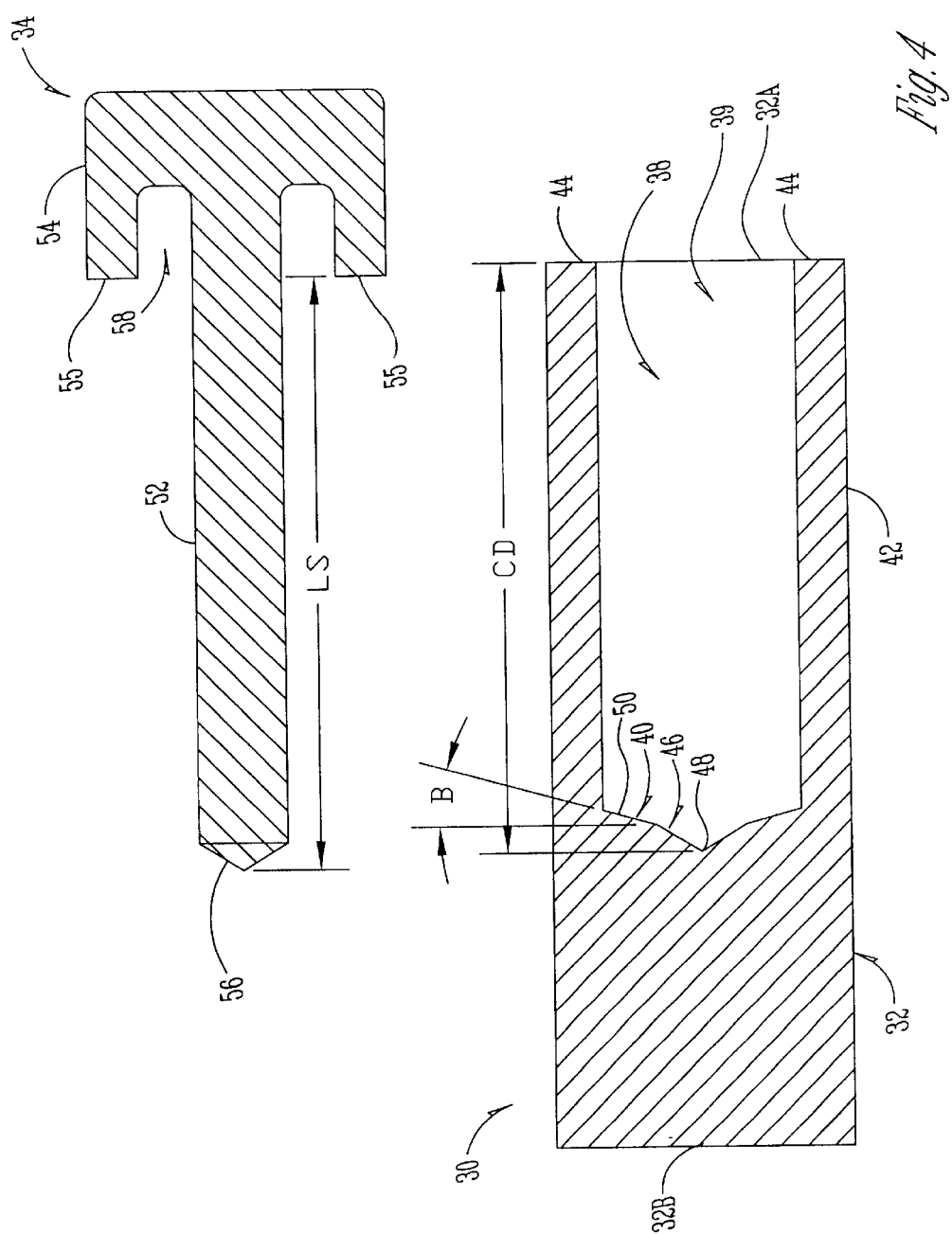

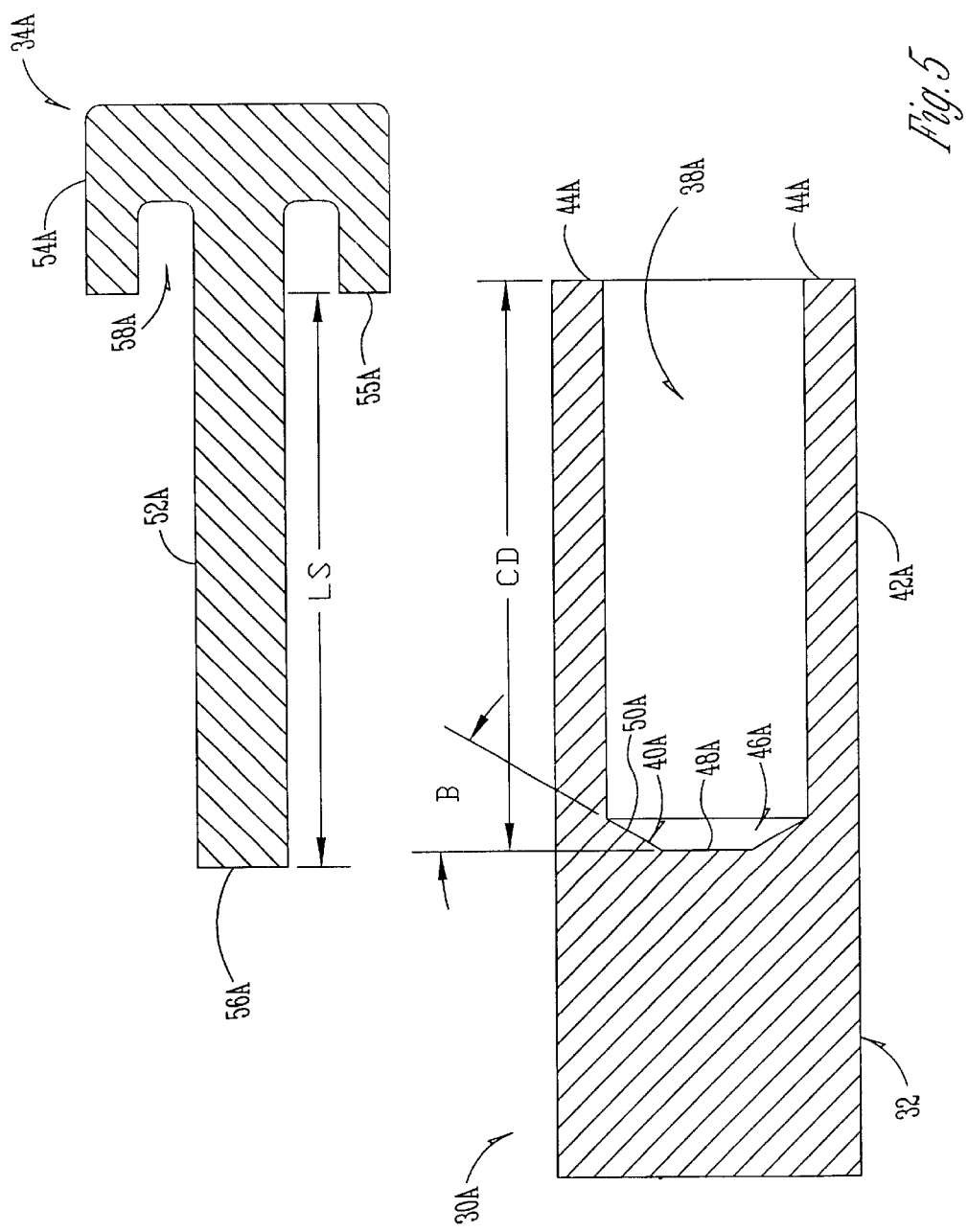

METHOD OF MAKING CLOSED CAVITY PISTONS

CROSS-REFERENCE TO RELATED APPLICATIONS

This application is a continuation-in-part of copending application Ser. No. 09/722,617 filed Nov. 27, 2000.

BACKGROUND OF THE INVENTION

The present invention relates to the field of hydrostatic units such as transmissions, pumps and motors. More particularly, this invention relates to closed cavity or reduced oil volume pistons that slidably reciprocate in the cylinder bores of hydrostatic units.

Conventional closed cavity pistons have been utilized in hydrostatic units for a variety of agricultural, turf care and construction equipment. One type of conventional closed cavity or reduced oil volume piston has an elongated cylindrical main body and a truncated cylindrical cap. One end of the main body is closed and the other end has a deep target-shaped or annular cavity formed therein by a relatively expensive "target drilling" operation. The target drilling operation leaves a centrally located stem that is integral with the closed end of the main body and protrudes to the open end. The cap is cold formed and has opposite closed and open ends. The open end includes an annular groove and truncated stem portion such that the cap registers and mates with the stem and outer wall of the main body at its open end. This conventional piston is assembled by adding a washer between the stem and inner wall of the main body near the open end. The washer is included to help center and stabilize the stem during welding. Then the cap and main body are inertia-friction welded together along a single transverse plane where their respective open ends meet. The result is a lightweight hollow closed cavity piston, but the cost and complexity of the target drilling operation make it a relatively expensive piston. Considering that hydrostatic units typically require several pistons for each unit, piston cost profoundly affects the overall cost of the units and hydrostatic transmissions they go into. Therefore, there is a need for a closed cavity piston and method of making the same that eliminates the target drilling operation and reduces cost.

SUMMARY OF THE INVENTION

The present invention relates to a closed cavity piston for hydrostatic units and methods of making the same. The closed cavity piston of this invention includes an elongated piston body and a separately formed piston cap having an elongated stem and head thereon. The body includes a closed end and an open end with a cavity having a bottom wall adjacent the closed end and an outer wall terminating in a rim at the open end. The stem of the piston cap is friction inertia welded to the bottom wall of the piston body and the head of the piston cap welds to the rim of the piston body so as cover the entrance opening and sealingly enclose the interior cavity. The piston components can both be formed by conventional and relatively inexpensive cold forming techniques. The stem of the cap is inserted into the cavity of the body until it engages the bottom wall. Then the cap is friction inertia welded to the body at the stem/bottom wall and head/rim interfaces after preheating.

BRIEF DESCRIPTION OF THE DRAWINGS

FIG. 4 is an exploded assembly view in longitudinal cross-section of the piston of FIG. 3.

FIG. 5 is an exploded assembly view similar to FIG. 4 but shows an alternative stem end and bottom wall configuration.

DETAILED DESCRIPTION OF THE PREFERRED EMBODIMENT(S)

Figure 1:
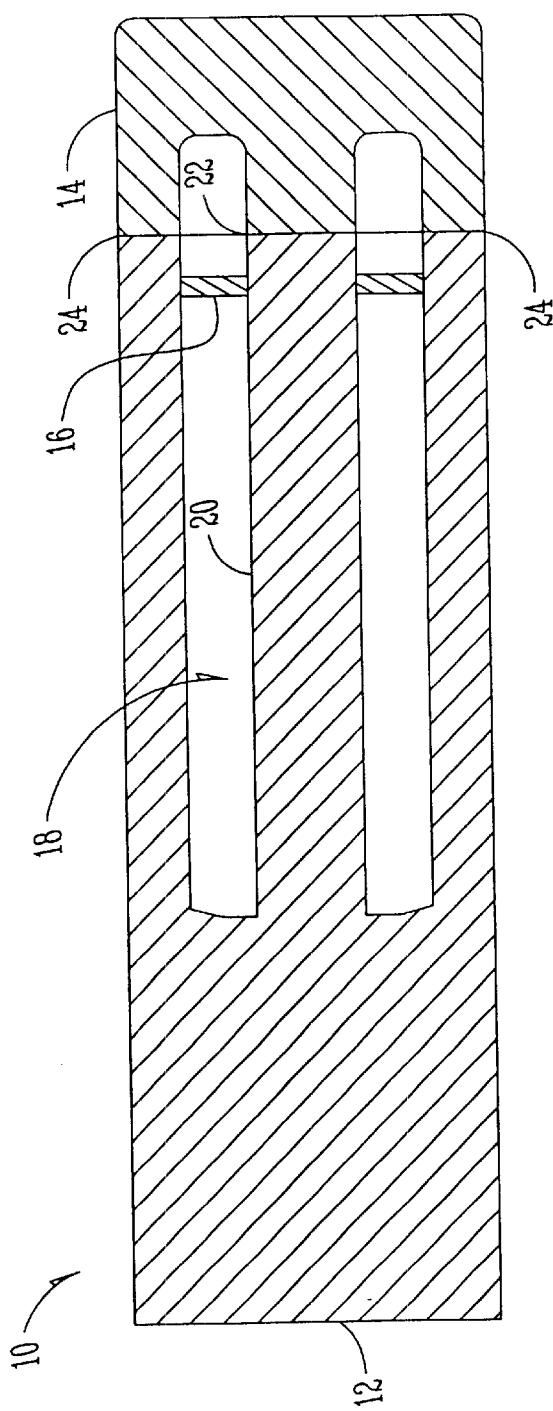
FIG. 1 is a central longitudinal cross-sectional view of a conventional piston.
Figure 2:
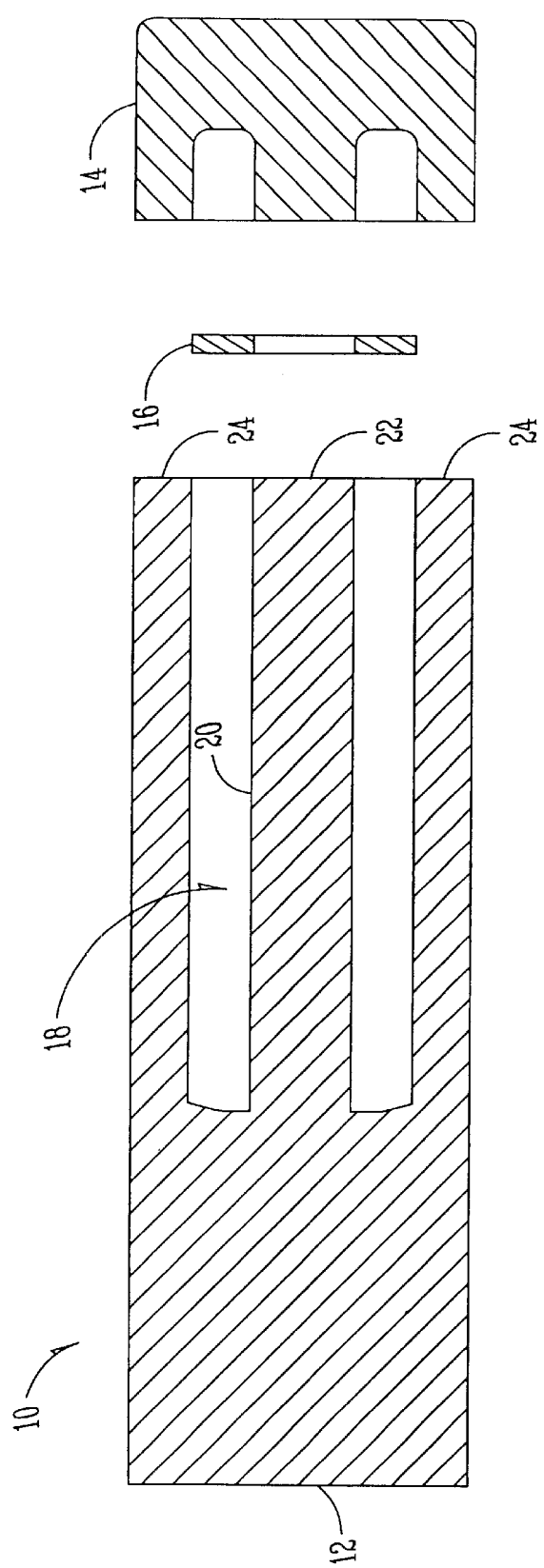
FIG. 2 is an exploded assembly view in longitudinal cross-section of the piston of FIG. 1.

A conventionally formed inertia welded piston 10 is shown in FIGS. 1 and 2. As briefly described above, the piston 10 includes a steel piston body 12, a cold formed steel piston cap 14 and a metal washer 16. The piston body 12 has a closed end, an open end, and an annular interior cavity 18. A stem 20 protrudes from the closed end of the piston body. The free end 22 of the stem 20 lies in the same plane as the rim 24 of the piston body 12. The piston cap 14 is cylindrical like the piston body 12 and is cold formed. However, because of the elongated stem 20, the piston body 12 cannot be cold formed. Instead, an expensive target drilling operation is required to form the cavity 18 and the stem 20. The cap 14 is inertia welded to the piston body 12 in a single transverse plane that includes the rim 24 and the end 22 of the stem 20.

Figure 3:
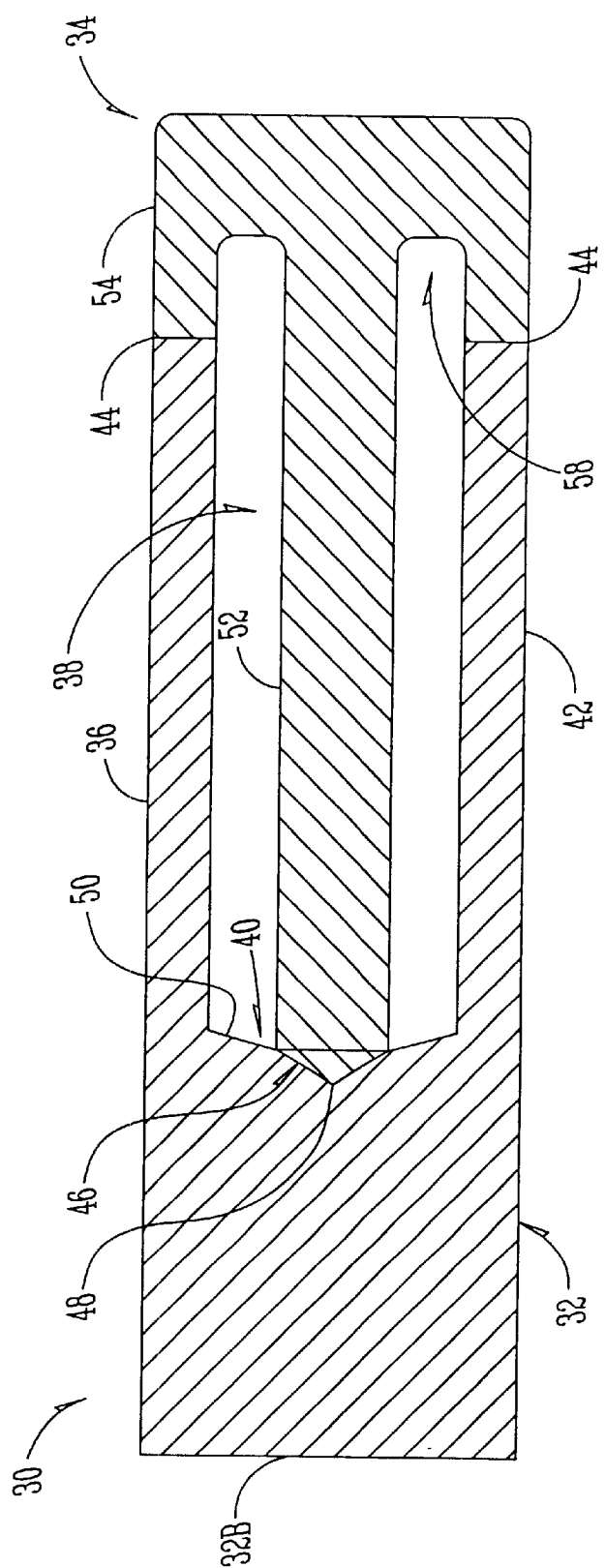
FIG. 3 is a central longitudinal cross-sectional view of a piston produced according to this invention.

Referring to FIGS. 3 and 4, the piston 30 of the present invention includes a steel piston body 32 and a steel piston cap 34. The piston body 32 is elongated and has opposite open and closed ends 32A and 32B, respectively. (FIG. 4). The piston body 32 is cylindrical and has a centrally located, generally cylindrical interior cavity 38 with a cylindrical well extending therearound. The open end 32A of the piston body 32 has an entrance opening 39 therein and the interior cavity 38 extends inwardly from the entrance opening so as to define a bottom wall 40 adjacent the closed end and outer wall 42 terminating in a rim 44 or contact portion at the open end 32A of the piston body 32 adjacent the entrance opening 39.

The bottom wall 40 has a socket or contact surface 46 formed therein, which includes a recessed central portion 48 and a countersink 50 leading thereinto. In the embodiment shown in FIGS. 3 and 4, the recessed central portion 48 is conical and is defined by an included angle of between 90 degrees and 165 degrees, more preferably about 120 degrees to allow formation with standard drills having 118 degree drill points if the parts are not cold formed with the bottom wall configuration complete. Preferably the countersink 50 forms an angle B of approximately 15 degrees with respect to a plane that is perpendicular to the central longitudinal axis of the piston body 32.

The cap 34 includes an elongated cylindrical stem 52 with a central longitudinal axis, opposite first and second ends, and a head 54 at the first end. The head 54 protrudes outwardly from the stem 52 in a direction transverse to the longitudinal axis of the stem. The head 54 is of sufficient size to cover the entrance opening 39 of the piston body 32. The head 54 of the cap 34 can include an optional annular recess or groove 58 surrounding the stem 52 to remove further weight from the piston 30. The cap 34 has a rim or contact surface 55 (FIG. 4) matching the contact surface 44 on piston body 32.

In the embodiment shown in FIGS. 3 and 4, the second end or contact surface 56 of the stem 52 is conical in shape so as to approximately mate with and engage the similarly shaped recessed central portion 48 or surface of a socket 46 in the bottom wall of the piston body 32. The countersink 50 of the socket 46 helps guide the second stem end 56 into the recess 48. The conical second end 56 of the stem has an included angle of between approximately 90 degrees and 165 degrees, more preferably about 120 degrees.

The embodiment shown in FIG. 5 is similar to the embodiment of FIGS. 3 and 4 in that the piston cap 34A attaches to the piston body 32', which has a central bore or interior cavity 38A therein, an outer wall 42A with a rim or contact surface 44A, and a bottom wall 40A. However, the second end or contact surface 56A of the stem 52A has a planar surface that extends perpendicular to the longitudinal axis of the stem. Likewise, the recessed central portion 48A of the socket 46A includes a round area defined by a planar contact surface extending perpendicular to the longitudinal axis of the piston body 32A. The round area of the recess 48A has a diameter that is approximately the same as the diameter of the second end 56A of the stem 52A. A countersink 50A is provided to guide the stem into the recess 48A.

To produce the piston 30 or 30A of this invention, the process is basically the same. The piston body 32, 32' and piston cap 34, 34A are both preferably provided in a ready-to-weld condition with the stem and bottom wall features already completed through a cold forming process. Alternatively, the components can be machined from scratch. Thus, the relatively expensive target drilling operation is not required in either case.

The stem 52, 52A inserts into the interior cavity 38, 38A until it engages the bottom wall 40, 40A. Then the components 32 and 34 or 32' and 34A are rotated relative to each other to join them by friction inertia welding. The length of the stem 52, 52A is slightly greater than the depth of the cavity 38, 38A to allow for the usual loss of length associated with inertia welding. Thus, the length of the stem LS is greater than the depth of the cavity CD by an amount sufficient to account for material loss at both the stem/bottom wall interface and the head/rim interface. However, care should be taken that LS is not too much greater than CD. Otherwise, the weld at the rim will be adversely affected or the stem will buckle. A buckled stem can cause problems when one later attempts to drill the conventional small longitudinal orifice hole through the piston via the stem. Friction-inertia welds are formed at the two different interfaces (55 and 44; and 56 and 48A), which reside in at least two different planes. It should be understood that the cold forming of the piston bodies (32 and 32') and caps (34 and 34A) allows for a net shape of these components without machining which is a substantial cost saving. However, to cold form these components necessitates two interface welding surfaces (for the cap 55 vs. piston body rim surface 44—FIGS. 4 and 5; and 56 and 56A vs. 48 and 48A—FIGS. 4 and 5). These respective surfaces are longitudinally spaced and are internal and externally located. The internal interfaces (e.g. 56 and 48) are particularly difficult to weld by inertial welding because their relative smaller areas generate less heat while being rotated.

Thus, to permit the piston structure of this invention to be successfully welded by the inertia process, which involves the application of longitudinal forces in opposite directions on the body 32 and cap 34, and the rotation of one against the other fixed member, it has been found that the parts need to be preheated at the critical areas to achieve an acceptable weld. An acceptable weld is defined as a defect-free weld in the minimum cross sectional thickness being joined (e.g. stem thickness for the internal weld). The analysis of an acceptable weld is a metallurgic process and eliminates welds which have voids, cracks, and other conventional factors such as shortcomings in strength and endurance.

Further, it has been discovered that the conditions of heat, pressure and rotational velocity have to be balanced with certain parameters for an effective weld on the device of this invention, and particularly the internal weld, to be acceptable. Experimentations have shown that the following values of high (H), medium (M) and low (L) from temperature, pressure and velocity must be met to achieve an acceptable inertia weld:

TABLE I

Parameters of Speed, Pressure And Heat For Acceptable Welds In Hydrostatic Pistons For Internal Welds

|  | Low (L) | Medium (M) | High (H) |
| --- | --- | --- | --- |
| Speed (rpms) | 4700 | 4800 | 4900 |
| Pressure (psi) | 1400 | 1500 | 1600 |
| Heat (applied Kw) | 8.1 | 8.8 | 9.5 |

TABLE 2

Combinations From Parameters of (1) Speed, (2) Pressure And (3) Heat Found To Be Acceptable To Produce Acceptable Welds In Hydrostatic Pistons For Internal Welds

| HHH | LHH | LLH |
| --- | --- | --- |
| HHL | MMM | HLH |
| LHL | LLL | HLL |

It will be understood from the drawings and the above description that the respective geometric attributes of the cap, stem end, piston body are parameters that can be adjusted to optimize the integrity of the friction inertia welds.

Based upon the foregoing it can be seen that the present invention at least satisfies its stated objectives.

What is claimed is:

1. A method of manufacturing closed cavity pistons, comprising,
   taking an elongated piston body having an internal cavity, a closed end, and an open end, and an external wall extending around the cavity and terminating in a first contact surface at the open end of the piston body,
   providing a second contact surface within the cavity which is longitudinally spaced from the first contact surface,
   taking a cap element having an elongated stem and a head comprises of a third and fourth contact surfaces which register with the first and second contact surfaces, respectfully, of the piston body,
   and simultaneously welding the first to the third surface and the second surface to the fourth surface by inertia friction welding whereby longitudinal pressure is applied to the piston body and the cap element to maintain their respective contact surfaces in tight longitudinal engagement, and then rotating one of the other to generate sufficient heat between the engaged contact surfaces to cause them to be fused together.

2. The method of claim 1 wherein the engaged contact surfaces are preheated before the inertial friction welding is undertaken.

3. The method of claim 1 wherein the parameters for applied longitudinal pressure is 1400–1600 psi; and parameters for rotational speed of the member being rotated is 4700–4900 rpms.

4. The method of claim 3 wherein the engaged contact surfaces are preheated before the inertial friction welding is undertaken.

5. The method of claim 4 wherein the parameters of preheat in applied Kws is 8.1–9.5.

6. The method of claim 5 wherein the low (L) medium (M) and high (H) values for speed are (L): 4,700 rpms; (M): 4,800 rpms; and (H) (4,900 rpms); and for pressure are (L) 1,400 psi; (M) 1500 psi; and (H) 1,600 psi; and for heat in applied Kws is (L) 8.1 Kw; (M) 8.8 Kw; and (H) 9.5 Kw; and the parameter level of speed, pressure and heat is approximately in the combined ranges of one of HHH; HHL; LHL; LHH; MMM; LLL; LLH; HLH and HLL.

7. The method of making by inertia friction welding an internal weld between a cap element and a piston body having internal welding interfaces, wherein the cap element having an elongated stem and a head, comprising the steps of:

preheating the internal welding interfaces, inserting the stem of the piston cap into the interior of the cavity of the piston body until the stem engages the bottom of the piston body, applying opposed longitudinal pressure to the cap element and the piston body to frictionally engage the cap element and the piston body at the interfaces, and rotating the cap element or the piston body to generate sufficient heat between the engaged contact surfaces to cause them to be fused together.

8. The method of claim 7 wherein the parameters for applied longitudinal pressure is 1400–1600 psi; and parameters for rotational speed of the member being rotated is 4700–4900 rpms.

9. The method of claim 8 wherein the engaged contact surfaces are preheated before the inertial friction welding is undertaken.

10. The method of claim 9 wherein the parameters of preheat in applied Kws is 8.1–9.5.

11. The method of claim 10 wherein the low (L) medium (M) and high (H) values for speed are (L): 4,700 rpms; (M): 4,800 rpms; and (H) (4,900 rpms); and for pressure are (L) 1,400 psi; (M) 1500 psi; and (H) 1,600 psi; and for heat in applied Kws is (L) 8.1 Kw; (M) 8.8 Kw; and (H) 9.5 Kw; and the parameter level of speed, pressure and heat is approximately in the combined ranges of one of HHH; HHL; LHL; LHH; MMM; LLL; LLH; HLH and HLL.

* * * * *

UNITED STATES PATENT AND TRADEMARK OFFICE
CERTIFICATE OF CORRECTION

PATENT NO.      : 6,491,206 B2
DATED           : December 10, 2002
INVENTOR(S)     : Robert J. Stoppek It is certified that error appears in the above-identified patent and that said Letters Patent is hereby corrected as shown below:

<u>Title page,</u>
Item [73], should read:

-- [73] Assignee: Sauer-Danfoss Inc., Ames, IA (US) --

Signed and Sealed this

Eighth Day of April, 2003

JAMES E. ROGAN
*Director of the United States Patent and Trademark Office*